United States Patent [19]

Powers, III et al.

[11] Patent Number: 4,472,306

[45] Date of Patent: Sep. 18, 1984

[54] SULFURIZING TRI-ISOBUTYLENE IN THE PRESENCE OF A PROMOTOR

[75] Inventors: William J. Powers, III, Port Arthur; Giles A. Rawls, Houston, both of Tex.; Steven P. Knutson, Rohnert Park, Calif.

[73] Assignee: Texaco Inc., White Plains, N.Y.

[21] Appl. No.: 448,469

[22] Filed: Dec. 10, 1982

[51] Int. Cl.³ ............................................. C10M 1/38
[52] U.S. Cl. .................................... 260/139; 252/45; 252/51; 252/51.5 A
[58] Field of Search ..................... 252/45, 51.5 A, 51; 260/139; 549/36

[56] References Cited

U.S. PATENT DOCUMENTS

| | | | |
|---|---|---|---|
| 3,673,090 | 6/1972 | Waldbillig et al. | 252/45 |
| 3,796,661 | 3/1974 | Suratwala et al. | 252/45 |
| 4,204,969 | 5/1980 | Papay et al. | 252/45 |

*Primary Examiner*—Jacqueline V. Howard
*Attorney, Agent, or Firm*—Robert A. Kulason; Robert Knox, Jr.; James J. O'Loughlin

[57] ABSTRACT

An improved method for preparing sulfurized triisobutylene whereby the sulfurization reaction is conducted in the presence of a N-halogen substituted organic promotor selected from the group consisting of N-halo aniline, N-halo succinimide and 1,3-N-dihalo dialkylhydantoin is provided.

6 Claims, No Drawings

SULFURIZING TRI-ISOBUTYLENE IN THE PRESENCE OF A PROMOTOR

BACKGROUND OF THE INVENTION

Sulfurized polyolefins are known additives for lubricating oils. They have been found useful as extreme pressure (EP) agents in lubricating oils, such as gear and cutting oils.

The prior art discloses methods for preparing a sulfurized triisobutylene which has sufficiently active sulfur to satisfactorily function as an extreme pressure agent and yet remain relatively insensitive to copper, that is, have a copper strip corrosion reading (3 hours/250° F.) of less than 4A. However, as reducing the total reaction time is a continuing concern (for obvious reasons of economics) and as the time concern is not answered by the prior art, work has progressed on finding how to prepare sulfurized triisobutylene in the shortest time possible.

In the instant invention it has been unexpectedly and surprisingly found that the reaction time in preparing sulfurized triisobutylene is reduced to a degree previously unobtainable when the sulfurization reaction is conducted in the presence of these halogen substituted organic promotors.

DESCRIPTION OF THE PRIOR ART

U.S. Pat. No. 3,796,661, discloses the preparation of sulfurized triisobutylene for use as high pressure agents in lubricating oils, in which the sulfurized polyolefin product is prepared by (a) mixing a mole ratio of triisobutylene to sulfur of between about 1:2.5 and 1:5 at between 50° and 100° F.; (b) continuously blowing the resultant mixture with an inert gas under continuous pressure and under elevated temperatures until the free sulfur weight in the said resultant reaction mixture is less than 0.3 weight percent; (c) stripping the blown mixture with inert gas at an elevated temperature at subatmospheric pressure; and (d) filtering the stripped product. The disclosure of this commonly assigned patent is incorporated herein by reference.

U.S. Pat. No. 2,995,569, discloses the preparation of sulfurized triisobutylene utilizing a mole ratio of sulfur to triisobutylene of about 5:1, with the reaction being conducted under atmospheric conditions and at a temperature of 350° to 420° F.

SUMMARY OF THE INVENTION

The invention relates to the use of an organic promotor, that is, a N-halogen substituted organic compound selected from the group consisting of N-halo aniline, N-halo succinimide and 1,3-N-dihalo-5,5-dialkylhydantoin, wherein said alkyl group comprises from about 1–5 carbon atoms, and wherein the halogen is selected from the group consisting of chlorine and bromine, to prepare sulfurized triisobutylene. The initial charge stocks, the triisobutylene and sulfur (which are in a molar ratio of between about 1:2.5 and 1:5, respectively) are, in the presence of the promotor, mixed; and the resultant mixture is reacted at a temperature of between about 350° and 475° F. under elevated pressures of between about 20 and 100 psig.

DETAILED DESCRIPTION OF THE INVENTION

Gas chromatographic analysis indicates that, for the most part, triisobutylene is comprised of two $C_{12}$ TIB isomers: 2,2,4,6,6-pentamethyl-3-heptene (Isomer 1) and 2-neopentyl-4,4-dimethyl-1-pentene (Isomer 2). Recycled TIB (that is, the unreacted TIB which has been stripped away from the reaction product) comprises more Isomer 1 than Isomer 2; on the other hand, fresh TIB (that is, unreacted TIB which has not been stripped from the reaction product) comprises more Isomer 2 than Isomer 1. Experiments conducted have demonstrated that as the amount of Isomer 2 increases from, for example, 20 to 40% of the reacted TIB, the reaction time is proportionately increased from 29 to 43 hours. The problem of increasing reaction time is even more acute in instances where twice recycled TIB is employed (that is, stripped TIB from the product of a first reaction is put into a second reaction, and the unreacted TIB of the second reaction is in turn put into a third reaction).

To decrease the reaction time of reactions employing both recycled TIB and also those employing fresh TIB, it had been found that when N-halogen substituted organic compounds selected from the group consisting of N-halo aniline, N-halo succinimide, and 1,3,-N-dihalo-5,5 dialkylhydantoin, wherein the alkyl group comprises from 1 to about 5 carbon atoms, and wherein the halogen is selected from the group consisting of chlorine and bromine, are present during the mixing and reacting steps of the charge stocks (sulfur and TIB) the total reaction time has been found to be significantly reduced. Examples of such promotors include N-chloro succinimide, N-bromo aniline, and 1,3-dibromo 5,5-dimethylhydantoin (DBDMH). The exact method by which the DBDMH promotes reaction and, thereby, reduces the time of reaction is not known, but it has been theorized that the DBDMH initiates the isomerization of 2,2,4,6,6-pentamethyl-3-heptene (Isomer 1- the less reactive isomer) to 2-neopentyl-4,4 dimethyl-1-pentene (Isomer 2-the more reactive isomer).

The process of the instant invention comprises (a) mixing fresh TIB, or a mixture of fresh and recycled TIB, and sulfur in the presence of a N-halogen substituted organic compound selected from the group consisting of N-halo succinimide, N-halo aniline and 1,3-N-dihalo 5,5 dialkyhydantoin, wherein said alkyl group comprises from 1 to about 5 carbon atoms, and wherein the halogen is selected from the group consisting of bromine and chlorine; the TIB and sulfur are present in a molar ratio of between about 1:2.5 and 1:5, preferably about 1:3; and (b) reacting the resultant product at a temperature of between 350° and 475° F. under elevated pressures of between about 20 and 100 psig until the free sulfur content in the formed mixture is less than 0.3 weight percent or, as an alternative reaction method, subjecting the resultant mixture produced in the mixing step to the following sequential step combination comprising a reaction step—passing (blowing) inert gas through the formed mixture at a rate of between about 0.1 and 1 standard cubic feet per hour (s.c.f.h.)/gallon mixture, preferably between about 0.3 and 0.6 s.c.f.h./gallon at a continuous pressure between about 20 and 100 p.s.i.g., preferably between about 30 and 40 p.s.i.g. and at a temperature of between about 375° and 465° F., preferably between about 440° and 445° F., and continuing until the free sulfur content in the formed mixture is less than 0.3 weight percent; and after the reaction a stripping step—passing inert gas through the blown mixture at a temperature of between about 320° and 360° F., preferably between about 340° and 350° F., under subatmospheric pressure, advantageously under a pressure of between about 1 and 200 mm. Hg., preferably between 2 and 100 mm. Hg until less than about 40 p.p.m. H₂S is detected in the stripped sulfurization product; and finally a filtering step—filtering the stripped product via standard means, e.g., utilizing filter paper, in line cartridge filtering and/or diatomaceous earth filtering means at ambient or superambient temperature and atmospheric or higher pressure.

Whether the reaction process proceeds in a single step or in a sequential multi-step reaction process, the filtered product is a red colored liquid determined to be a major amount of complex mixture comprising a major amount of (for example, 99–100 weight percent) 4-neopentyl-5-tertiary butyl-1,2 dithiole-3-thione and a minor amount (for example, 0–1.0 weight percent) of organic sulfides, polymeric sulfur substituted compounds, mercaptans and the like, essentially giving the following general analysis:

| Tests: | Range |
| --- | --- |
| Specific gravity, 60/60° F. | 1.05–1.20 |
| Kin. vis., at | |
| 40° C. | 54–106 |
| 100° C. | 4.85–7.80 |
| Sulfur, wt. percent | 31.5–34.5 |
| H₂S, p.p.m. | 5–40 |
| Average molecular weight | 260–280 |
| Flash, COC, °F. | 320–360 |
| Copper strip corrosion 3 hours/250° F. 1 wt. percent in paraffinic oil (125 SUS at 100° F.): | <4A |
| Acetone insolubles, wt. percent: | <0.12 |
| Free sulfur, wt. percent: | <0.3 |

In the foregoing sequential multi-step reaction process procedure, the reaction period for step 1 (mixing and heating up) is between about 0.5 and 5 hours; for step 2 (reaction), between about 15 and 25 hours; for step 3 (stripping), between about 8 and 15 hours; and for step 4 (filtering), between about 0.25 and 1 hour.

The inert gas employed is usually nitrogen since it is readily available and inexpensive. Other gases, however, which are inert to the reaction such as carbon dioxide can be utilized. It is important during the entire reaction period for the inert gas to be blowing and for the reaction to be conducted under continuous pressure of greater than 25 p.s.i.g.

During each of the two reaction processes, the reactor is periodically monitored. The reaction is considered completed when less than 0.05 volume percent of sediment is formed when a mixture comprising 20 ml. of the reaction sample and 80 ml. of acetone is thoroughly agitated in a 100 ml. glass cylinder. However, additional reaction time may be required after the aforementioned values are obtained if further reduction of copper corrosivity of the final product is deemed desirable.

The resultant sulfurized TIB product as heretofore stated is an effective extreme pressure additive in gear and cutting oils. It is normally present in the base oil in the amount of about 0.3 and 10 weight percent, preferably between about 3 and 7 weight percent. The base oils employed are advantageously napthenic and paraffinic mineral oils of an SUS viscosity of between about 100 and 2500 at 100° F. In a typical gear and cutting oil lubricant composition, in addition to the sulfurized TIB extreme pressure products, other additives such as VI improvers (for example, polyalkylmethacrylate), detergent dispersants (for example, alkenyl succinimides), wear inhibitors (for example, lauryl or oleyl acid orthophosphate), rust inhibitors (for example, oleyl amine) and lubricity agents (for example, fatty carboxylic acids and lauryl oleyl acid orthophosphate) are normally present.

To prepare the organic promotor compounds of the subject invention, the organic compounds of interest N-halo succinimide, N-halo aniline, 1,3-N-dihalo-5,5-dialkylhydantoin, wherein said alkyl group comprises from 1 to 5 carbon atoms, are N-halogen substituted with halogen atoms selected from the group consisting of chlorine and bromine. Thus, chlorine or bromine is attached to the nitrogen atom of the aniline or succinimide compound to form the following: N-chloro succinimide or N-bromo succinimide, or N-bromo aniline or N-chloro aniline. In the case where the alkyl group of the 5,5 dialkylhydantoin compound is, for example, a methyl group, both the 1 and 3 positions are halogen substituted. These positions are substitued with the same or different halogen atom; for example, if bromine was the only halogen substituent employed, the compound formed would be 1,3-dibromo-5,5-dimethylhydantoin. Other possible 5,5 dialkylhydantoins which can be halogen substitued include 5,5- diethylhydantoin, 5,5-dipropylhydantoin, 5,5-diisobutylhydantoin, and the like. The preferred promoters are N-chloro succinimide, N-bromo aniline, and 1,3 dibromo-5,5-dimethylhydantoin.

To produce the desired results (i.e., reduced reaction time) sufficient amounts of promotor must be added to the system. The examples which are listed and discussed below use from 100 to 500 p.p.m. of promotor to prepare the sulfurized triisobutylene employing the sequential multi-step reaction process, that is, subjecting a mixed product produced in the mixing step to a reaction step, a stripping step and, finally, to a filtering step. The preferred amount of promoter added to the reaction mixture is 200 ppm.

TABLE I

| | REACTION TRIALS | | | | | |
| --- | --- | --- | --- | --- | --- | --- |
| Run No. | 1 | 2 | 3 | 4 | 5 | 6 |
| Reactor volume, gal. | 10 | 10 | 10 | 10 | 10 | 10 |
| DBDMH, ppm | 0 | 100 | 200 | 500 | 200 | 200 |
| Charge | | | | | | |
| DBDMH, gms. | 0 | 3 | 6 | 15 | 6 | 6 |
| Fresh TIB, lbs. | 27 | 27 | 27 | 27 | 27 | 27 |
| Recycle TIB, lbs. | 13 | 13 | 13 | 13 | 13 | 13 |
| Sulfur, lbs. | 25 | 25 | 25 | 25 | 25 | 25 |
| Heat-up | | | | | | |
| Temp, F.° | 100–420 | 75–420 | 70–420 | 84–421 | 94–465 | 82–461 |
| Time, hrs. | 4 | 3 | 2 | 2 | 5 | 4 |
| N₂ Sparge, SCFH/GAL | 0.92 | 0.92 | 0.92 | 0.92 | 0.92 | 0.92 |
| RPM of Mixer | 170 | 170 | 170 | 170 | 170 | 50 |

TABLE I-continued

| Run No. | REACTION TRIALS | | | | | |
|---|---|---|---|---|---|---|
| | 1 | 2 | 3 | 4 | 5 | 6 |
| Reaction | | | | | | |
| Temp, F.° | 420–443 | 420–432 | 420–440 | 421–440 | 470–469 | 460–470 |
| Time to meet AI limit[1], hrs. | 22 | 16 | 12 | 12 | 6 | 10 |
| $N_2$ Sparge, SCFH/GAL | 0.92 | 0.92 | 0.92 | 0.92 | 0.92 | 0.92 |
| Pressure, psig | 30–32 | 29–32 | 29–31 | 29–32 | 30 | 29–31 |
| RPM of Mixer | 170 | 170 | 170 | 170 | 170 | 50 |
| Additional Reaction | | | | | | |
| Temp, F.° | 408–420 | 400–432 | 401–427 | 396–440 | 407–461 | 403–458 |
| Time, hrs. | 8 | 8 | 12 | 8 | 8 | 6 |
| $N_2$ Sparge, SCFH/GAL | 0.92 | 0.92 | 0.92 | 0.92 | 0.92 | 0.92 |
| Pressure, psig | 0–30 | 0–30 | 0–31 | 0 | 0 | 0 |
| RPM of Mixer | 170 | 170 | 170 | 170 | 170 | 50 |
| Total Reaction, hrs. | 30 | 24 | 24 | 22 | 16 | 16 |

[1]To pass the AI test (acetone insolubles) a sediment reading of 0.05 vol. % or lower must be achieved. The test involves mixing a 20 ml aliquot of the sample with 80 ml of acetone in a 100 ml graduated cylinder and centrifrying the mixture at 2000 r.p.m. for 30 minutes.

From the results, it is demonstrated that the presence of the 1,3-dibromo-5,5-dimethylhydantoin (DBDMH) promoter reduced the time the reaction needed to be run in order to pass the AI test of 0.05 vol% or less sediment reading. Four reactions (1-4) were conducted where the maximum temperature reached was 420° F. Reaction 1 was conducted in the presence of 0 ppm. of DBDMH; reaction 2, in the presence of 100 ppm of DBDMH; reaction 3, in the presence of 200 ppm of DBDMH; reaction 4, in the presence of 500 ppm. of DBDMH. The time needed to pass the AI test was, accordingly. 22 hours, 16 hours, 12 hours and 12 hours; thus, a 30 to 47% savings in time is achieved over a reaction that was run without any DBDMH promoter. When the maximum reaction temperature was increased to 470° and the reaction was conducted in the presence of 200 ppm of DBDMH, the AI time was 6 hours in the first instance and 10 hours in the second. This represents even greater time savings.

The reaction is continued even after the product passes the AI standard in order to insure that satisfactory free sulfur and copper corrosion values are obtained. The total reaction time of 30 hrs in reaction 1; 24 hours in reaction 2; 24 hours in reaction 3; 24 hours in reaction 3; 22 hours in reaction 4; 16 hours in reaction 5; and 16 hours in reaction 6, represent the maximum time needed to prepare the products, EP agents, having commercially acceptable free sulfur and copper strip corrosion valves.

In Table II below the physical properties of the EP agents prepared in runs 1–6 are presented.

TABLE II

| Run No. | 1 | 2 | 3 | 4 | 5 | 6 |
|---|---|---|---|---|---|---|
| Tests: | | | | | | |
| Flash, COC, °F. | 370 | 350 | 350 | 370 | 360 | 310 |
| Sp. Gr. 60/60° F. | 1.1349 | 1.1369 | 1.1362 | 1.1404 | 1.1359 | 1.1350 |
| Kin. Vis. CS/40° C. | 86.72 | 77.5 | 77.7 | 101 | 91.51 | 92.51 |
| CS/100° C. | 6.79 | 6.6 | 6.5 | 7.3 | 7.06 | 7.12 |
| $H_2S$ Evolution, ppm | — | 30 | 16 | 8 | 4 | 0.00 |
| Sulfur, wt. % | 34.2 | 34.6 | 34.4 | 34.9 | 34.3 | 36.3 |
| Acetone Insolubles, wt. % | 0.08 | <0.05 | <0.05 | <0.05 | <0.05 | 0.04 |
| Free Sulfur, wt. % | 0.04 | 0.07 | 0.05 | 0.04 | 0.09 | 0.04 |
| Sediment | 0.0 | 0.0 | 0.02 | 0.01 | 0.04 | 0.4 |
| Copper Strip Corrosion | | | | | | |
| 3 Hr/212° F. | 4B | 1B | 1B | 1B | 1B | 4A |
| 3 Hr/250° F. | 1B | 2B | 2A | 1B | 1B | 1B |

As is observed by comparing the obtained values, that is, the physical property values of the product of run 1 (where no promoter was employed) and the physical property values of the products of runs 2–6 (where from 100–500 ppm. of the DBDMH promoter was employed), there is, on the whole, no substantial deviation in results. The presence of DBDMH had no detrimental effect on the EP product.

Thus, in view of the above, the use of promotors and especially N-chloro succinimide, N-bromo aniline, and 1,3 dibromo-5,5-dimethylhydantoin have been unexpectedly and surprisingly found to reduce the reaction time in order to meet the AI test standard. Also, as demonstrated, the physical properties (that is, for example, the free sulfur and copper strip corrision values) of products produced in reactions in which the DBDMH promotor was present has not been adversely affected.

We claim:

1. In a method for making a sulfurized triisobutylene in which a mixture of triisobutylene and sulfur are reacted employing a mole ratio of said triisobutylene to said sulfur of between 1:2.5 and 1:5 respectively, a reaction temperature of between 350° and 475° F. and an elevated pressure of between 20 and 100 p.s.i.g. until the free sulfur content in the formed mixture is less than about 0.3 weight percent, the improvement which comprises conducting said reaction in the presence of an N-halogen substituted organic promotor selected from the group consisting of N-halo succinimide, N-halo aniline and 1,3-N-dihalo-5,5 dialkylhydantoin, wherein said alkyl group comprises from about 1–5 carbon atoms, and wherein said halogen is selected from the group consisting of bromine and chlorine.

2. A process according to claim 1 wherein the promotor is 1,3-dibromo-5,5-dimethylhydantoin.

3. A process according to claim 1 wherein the promotor is N-bromo succinimide.

4. A process according to claim 1 wherein the promotor is N-bromo aniline.

5. In a method for making a sulfurized triisobutylene in which a mixture of triisobutylene and sulfur are reacted employing a mole ratio of said triisobutylene to sulfur of between about 1:2.5 and 1:5, (B) continuously passing an inert gas through the resultant mixture maintained at a temperature between about 375° and 465° F. under continuous pressure between about 25 and 100 p.s.i.g. at a rate of between about 0.1 and 1 s.c.f.h. per gallon of resultant mixture until the free sulfur in the resultant mixture is less than 0.3 weight percent, (C) stripping the inert gas treated resultant mixture with inert gas at a gas rate of between about 0.1 and 1 s.c.f.h. per gallon of reaction mixture and at a temperature between about 320° and 360° F. under subatmospheric pressure, (D) and filtering the reduced pressure treated mixture to recover said product as filtrate, the improvement which comprises conducting said reaction in presence of a N-halogen substituted organic promotor compound selected from the group consisting of N-halo succinimide, N-halo aniline and 1,3-N-dihalo-5,5-dialkylhydantoin, wherein the alkyl group comprises from about 1–5 carbon atoms, that are N-halogen substituted, and wherein the employed halogen is selected from the group consisting of bromine and chlorine.

6. A process according to claim 3 wherein the promoter is 1,3 dibromo-5,5-dimethylhydantoin.

* * * * *